United States Patent [19]

Nishiyama

[11] Patent Number: 4,580,644

[45] Date of Patent: Apr. 8, 1986

[54] LOAD CELL TYPE WEIGHT MEASURING DEVICE AND A SENSITIVITY CHECKING METHOD THEREOF

[75] Inventor: Yoshihisa Nishiyama, Shizuoka, Japan

[73] Assignee: Tokyo Electric Co., Ltd., Tokyo, Japan

[21] Appl. No.: 616,557

[22] Filed: Jun. 1, 1984

[30] Foreign Application Priority Data

Jun. 9, 1983 [JP] Japan .............................. 58-103480
Jun. 9, 1983 [JP] Japan .............................. 58-103481

[51] Int. Cl.$^4$ .................... G01G 19/52; G01G 3/14; G01L 25/00
[52] U.S. Cl. ............................. 177/50; 177/210 R; 73/1 B
[58] Field of Search .................. 177/25, 50, 210 R; 73/1 B

[56] References Cited

U.S. PATENT DOCUMENTS 3,728,626 4/1973 Douglas et al. ............ 177/211 X
4,158,396 6/1979 Suzuki et al. .
4,294,322 10/1981 Nishiyama .
4,375,838 3/1983 Yano et al. ................. 177/50
4,535,854 8/1985 Gard et al. .................. 177/50 X Primary Examiner—George H. Miller, Jr.
Attorney, Agent, or Firm—Frishauf, Holtz, Goodman & Woodward

[57] ABSTRACT

A load cell type weight measuring device includes a load cell which produces an output voltage corresponding to the weight applied thereto, an amplifier circuit for amplifying the output voltage of the load cell, and an A/D converter for converting an output voltage of the amplifier circuit to digital data. This weight measuring device further includes a rated voltage generating circuit for generating an output voltage equal to the output voltage generated from the load cell which is applied with a rated weight; switches for selectively connecting the load cell, the rated voltage generating circuit and the ground terminal to the amplifier circuit; and a microcomputer which gives control signals to the switches and inhibits the output data of the A/D converter from being supplied as effective weight measurement data when it is detected that the difference between two items of output digital data of the A/D converter, which are respectively obtained when the ground terminal and the rated voltage generating circuit are selected, exceeds a predetermined range.

20 Claims, 10 Drawing Figures

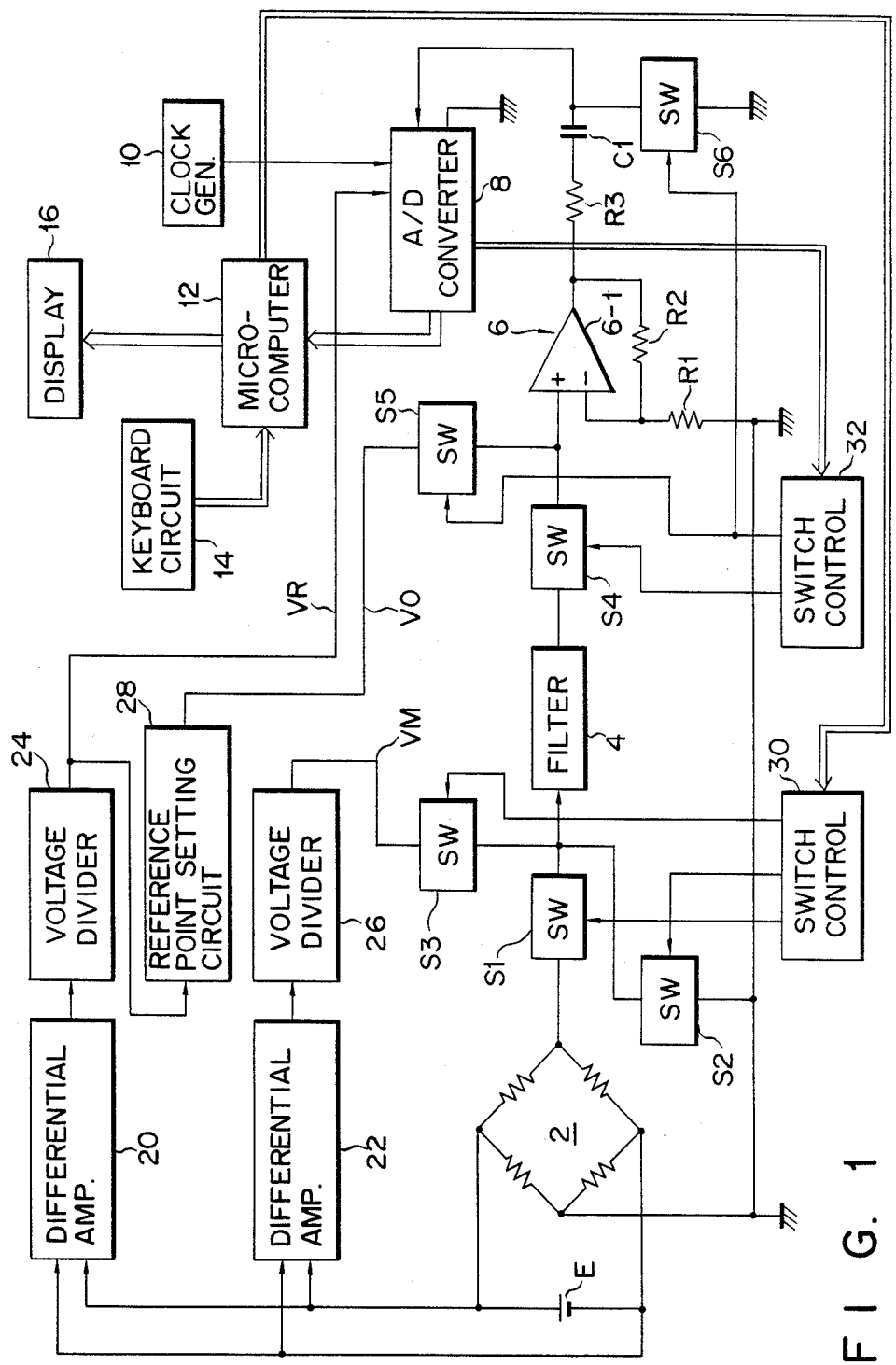
F I G. 1

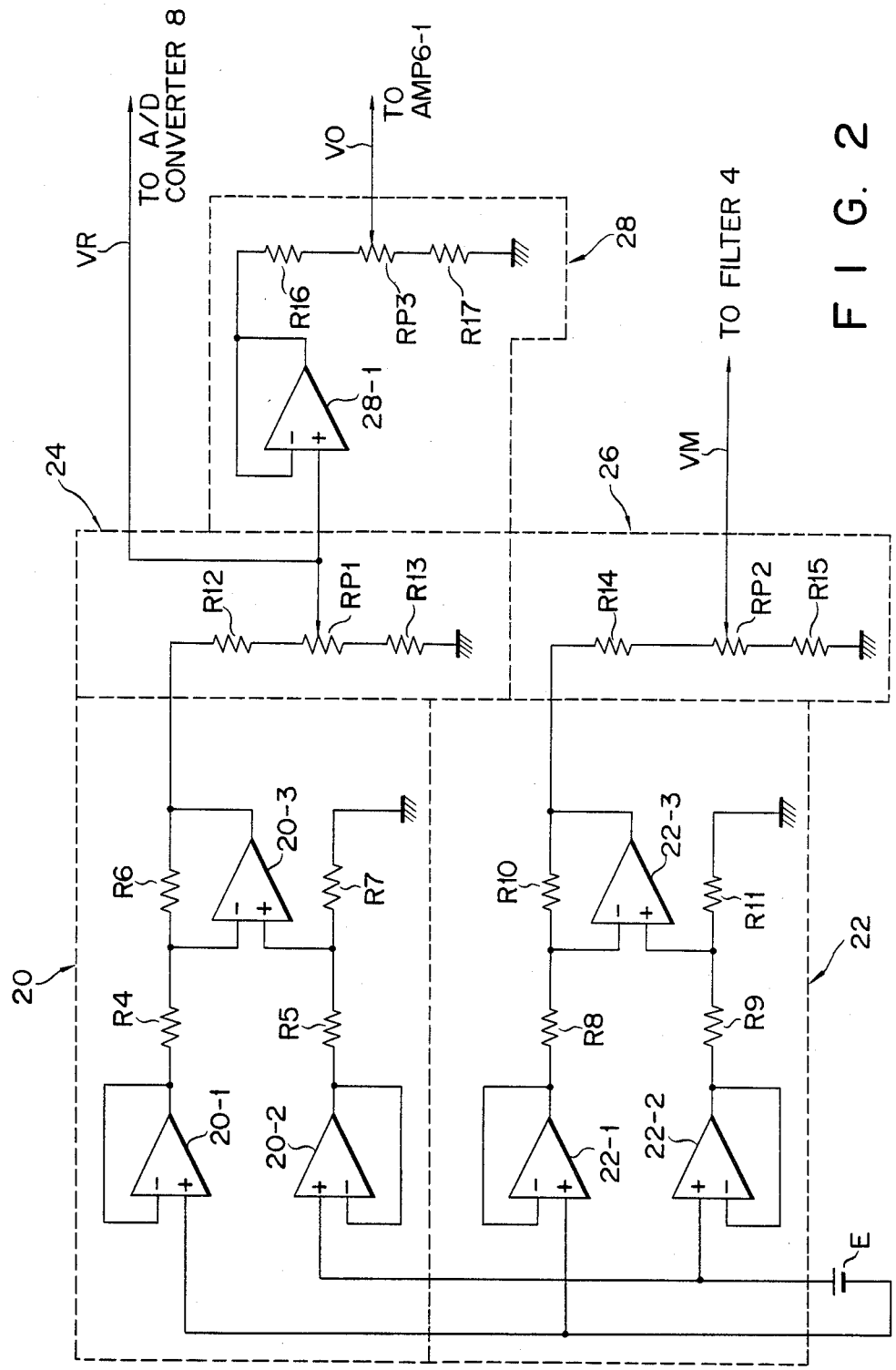
F I G. 2

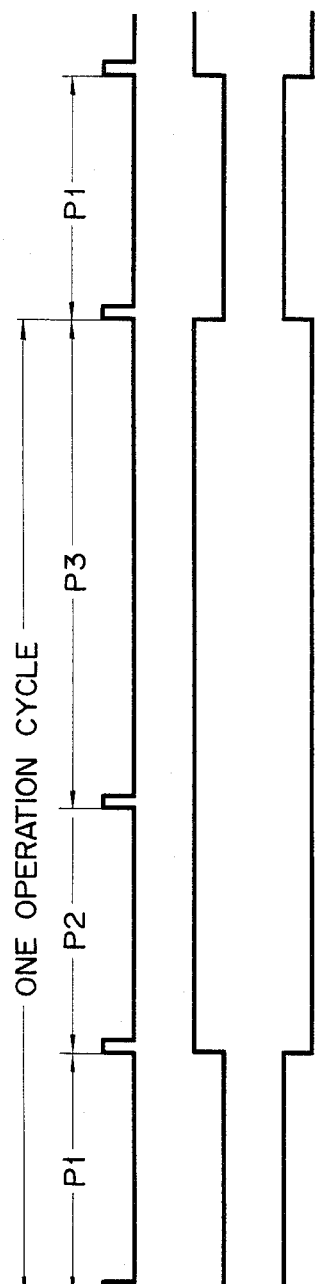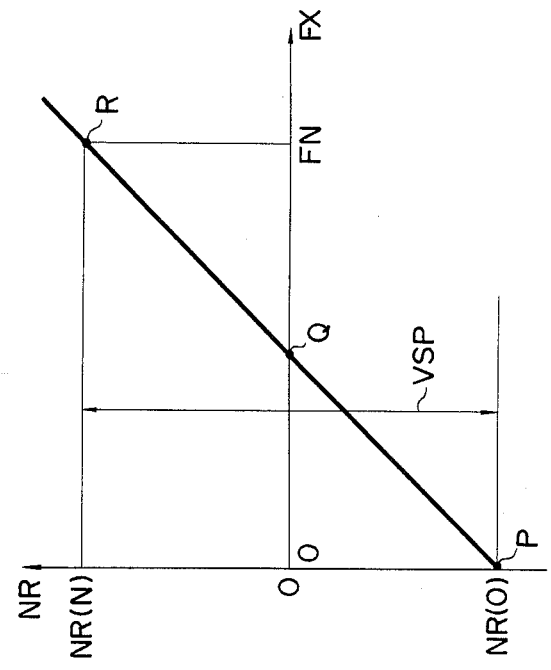
FIG. 3A
FIG. 3B
FIG. 3C
FIG. 4

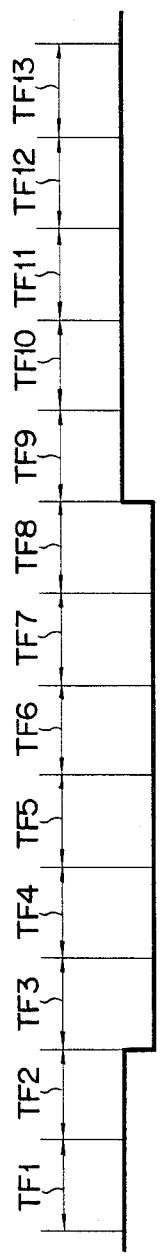
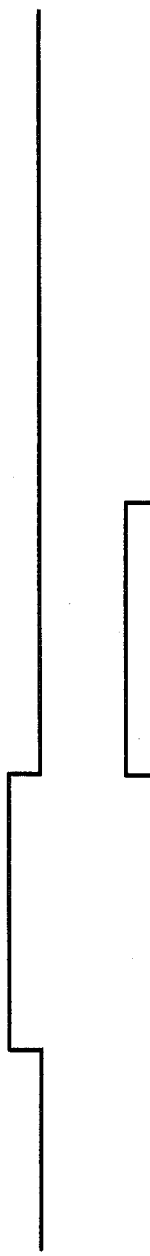
F I G. 5A
F I G. 5B
F I G. 5C

LOAD CELL TYPE WEIGHT MEASURING DEVICE AND A SENSITIVITY CHECKING METHOD THEREOF

BACKGROUND OF THE INVENTION

The present invention relates to a load cell type weight measuring device and a sensitivity checking method thereof.

Generally, a high degree of accuracy is required for load cell type weight measuring devices and, in particular, the authorized examination regarding the measurement precision is severe in West Germany and Switzerland. In this point, since the type of load cell itself has been authorized, no problem will be caused in particular. However, even when the load cell whose type has been authorized in this way is used, if the operation of the circuit section is not normal, the weight measurement cannot be performed accurately. Particularly, in the load cell type weight measuring device, to keep the relation between the weight and the measurement signal to be linear at least within a measurement range, it is necessary to always maintain the sensitivity of the load cell type weight measuring device to be a predetermined value. For this purpose, although the sensitivity checking examination is needed to be performed for the load cell type weight measuring device, the conventional load cell type weight measuring device did not have an appropriate sensitivity checking examination function.

SUMMARY OF THE INVENTION

It is an object of the present invention to provide a load cell type weight measuring device having a sensitivity checking function.

Another object of the invention is to provide a sensitivity checking method in the load cell type weight measuring device.

These objects are accomplished by a load cell type weight measuring device comprising a load cell producing an output voltage corresponding to the weight applied thereto; a rated voltage generating circuit for generating an output voltage equal to the output voltage generated by this load cell which is applied with a rated weight; an amplifier circuit; a switching circuit for selectively coupling one of the load cell, rated voltage generating circuit and reference potential terminal with the amplifier circuit; an analog/digital converter for converting an output voltage of the amplifier circuit to digital data; and a data processing unit which gives control signals to the switching circuit and inhibits the output data of the analog/digital converter from being supplied as effective weight measurement data when the data processing unit detects that the difference between two items of output digital data of the analog/digital converter which are respectively obtained when the rated voltage generating circuit and reference potential terminal are coupled with the amplifier circuit, exceeds a predetermined range.

In this invention, the rated voltage generating circuit and reference potential terminal are coupled with the amplifier circuit at different timings by the switching circuit, and the sensitivity of this load cell type weight measuring device can be easily checked on the basis of the digital data derived at this time from the analog/digital converter.

BRIEF DESCRIPTION OF THE DRAWINGS

FIG. 1 is a circuit diagram of a load cell type weight measuring device according to one embodiment of the present invention;

FIG. 2 is a circuit diagram of differential amplifiers, voltage dividers and reference point setting circuit shown in FIG. 1;

FIGS. 3A to 3C are signal waveform diagrams to describe the operation of an A/D converter shown in FIG. 1;

FIG. 4 shows the relation between the weight which is applied to a load cell shown in FIG. 1 and digital output data from the A/D converter;

FIGS. 5A to 5C are signal waveform diagrams to explain the sensitivity checking operation of the load cell type weight measuring device shown in FIG. 1.

DETAILED DESCRIPTION OF THE PREFERRED EMBODIMENT

Figure 6:
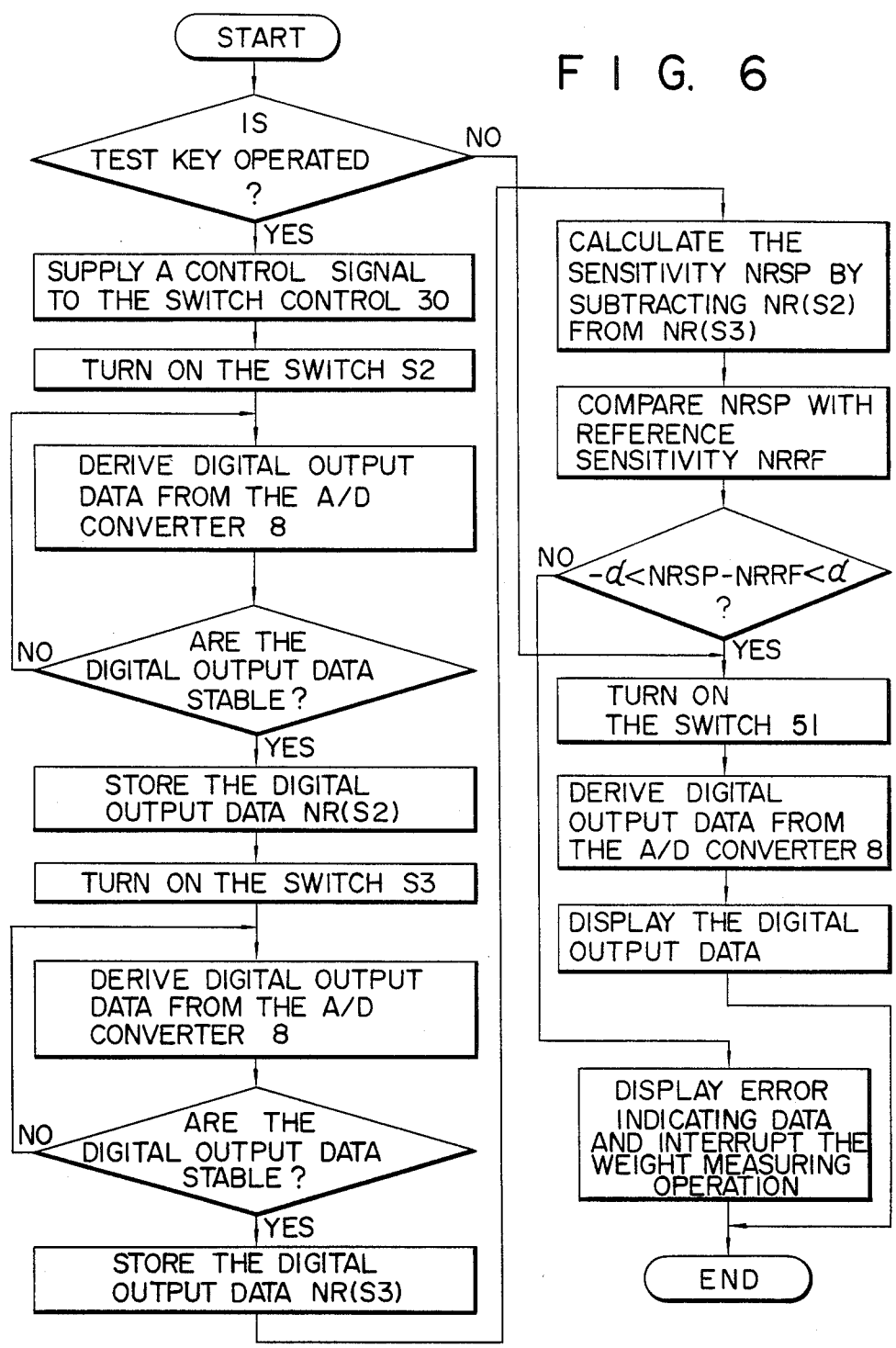
FIG. 6 is a flowchart to explain the operation of the load cell type weight measuring device shown in FIG. 1.

FIG. 1 shows a circuit of a load cell type weight measuring device according to one embodiment of the present invention. This load cell type weight measuring device includes a load cell 2 which is constituted by connecting four strain gauge resistors in a bridge form; a driving power source E for supplying a driving voltage VE to the load cell 2; a low pass filter 4 for removing the AC component from an output signal of the load cell 2; and an amplifier circuit 6 for amplifying an output signal of the low pass filter 4. The amplifier circuit 6 includes an operation amplifier 6-1; and resistors R1 and R2 which are connected in series between an output terminal of the amplifier 6-1 and the ground, a junction between these resistors being coupled to an inverting input terminal of the amplifier 6-1. An output terminal of the amplifier 6 is coupled to an analog/digital converter 8 through a resistor R3 and a capacitor C1. The A/D converter 8 is, for example, of the dual slope type and supplies to a microcomputer 12 a digital data NR corresponding to a difference between an input voltage VI and a reference voltage VR in response to an output pulse from a clock generator 10 for generating a clock pulse of a frequency $f_c$. A keyboard circuit 14 which includes a sensitivity checking key and various function keys (not shown) and a display 16 are coupled to the microcomputer 12.

Both ends of the driving power source E are coupled to respective input terminals of differential amplifier circuits 20 and 22. Output terminals of the differential amplifier circuits 20 and 22 are coupled to voltage dividers 24 and 26, respectively. The voltage divider 24 divides an output voltage of the differential amplifier circuit 20 and supplies the reference voltage VR to the A/D converter 8. A reference point setting circuit 28 divides the output voltage VR of the voltage divider 24 and generates an output voltage VO to set a reference operation point of the A/D converter 8. In addition, the voltage divider 26 divides an output voltage of the differential amplifier circuit 22 and supplies to the filter 4 a dummy rated voltage VM which is set equal to a rated output voltage generated from the load cell 2 when a rated weight is applied to the load cell 2.

Furthermore, this load cell type weight measuring device includes switch control circuits 30 and 32; analog switches S1 to S3 which are controlled in response to control signals from the switch control circuit 30; and analog switches S4 to S6 which are controlled in response to control signals from the switch control circuit 32. The switch S1 is connected between the output terminal of the load cell 2 and the input terminal of the filter 4. The switch S2 is connected between the input terminal of the filter 4 and the ground. The switch S3 is connected between an output terminal of the voltage divider 26 and the input terminal of the filter 4. The switch S4 is connected between the output terminal of the filter 4 and a non-inverting input terminal of the operation amplifier 6-1. The switch S5 is connected between an output terminal of the reference point setting circuit 28 and the non-inverting input terminal of the operation amplifier 6-1. The switch S6 is connected between the input terminal of the A/D converter 8 and the ground.

FIG. 2 shows a circuit of the differential amplifier circuits 20 and 22, the voltage dividers 24 and 26, and the reference point setting circuit 28.

The differential amplifier circuit 20 includes buffer amplifiers 20-1 and 20-2 whose input terminals are respectively coupled to positive and negative terminals of the driving power source E; and a differential amplifier 20-3 whose inverting input terminal and non-inverting input terminal are respectively coupled to output terminals of the buffer amplifiers 20-1 and 20-2 through resistors R4 and R5. An output terminal of the differential amplifier 20-3 is connected through a resistor R6 to its inverting input terminal, while its non-inverting input terminal is grounded through a resistor R7. The differential amplifier circuit 22 includes buffer amplifiers 22-1 and 22-2, a differential amplifier 22-3, and resistors R8 to R11 which are connected in the same manner as the buffer amplifiers 20-1 and 20-2, differential amplifier 20-3 and resistors R4 to R7 of the differential amplifier circuit 20.

The voltage divider 24 includes a resistor R12, a potentiometer RP1 and a resistor R13 which are connected in series between the output terminal of the differential amplifier 20-3 and the ground. A wiper terminal of the potentiometer RP1 is coupled to the A/D converter 8. The voltage divider 26 includes a resistor R14, a potentiometer RP2 and a resistor R15 which are connected in series between an output terminal of the differential amplifier 22-3 and the ground. A wiper terminal of the potentiometer RP2 is connected to the input terminal of the filter 4 through the switch S3.

The reference point setting circuit 28 includes a buffer amplifier 28-1 whose input terminal is connected to the wiper terminal of the potentiometer RP1, and a resistor R16, a potentiometer RP3 and a resistor R17 which are connected in series between an output terminal of the buffer amplifier 28-1 and the ground. A wiper terminal of the potentiometer RP3 is connected to the non-inverting input terminal of the operation amplifier 6-1 through the switch S5.

Assuming that R4=R5 and R6=R7 in the differential amplifier circuit 20 shown in FIG. 2, an output voltage V20 represented by the following equation will be supplied from the differential amplifier circuit 20.

$$V20 = \frac{R6}{R4} \cdot VE \tag{1}$$

Now, assuming that a voltage dividing ratio of the voltage divider 24 is k1, an output voltage V24 or VR of the voltage divider 24 is given by the following equation.

$$V24 = k1 \cdot V20 = k1 \cdot \frac{R6}{R4} \cdot VE \tag{2}$$

Assuming that an amplification factor of the buffer amplifier 28-1 is 1 and a voltage dividing ratio of the voltage divider which is constituted by the resistor R16, potentiometer RP3 and resistor R17 is k2, an output voltage V28 of the reference point setting circuit 28 is given by the following equation.

$$V28 = k2 \cdot V24 = k1 \cdot k2 \cdot \frac{R6}{R4} \cdot VE \tag{3}$$

In addition, assuming that R8=R9 and R10=R11 in the differential amplifier circuit 22, an output voltage V22 of the differential amplifier circuit 22 is given by the following equation.

$$V22 = \frac{R10}{R8} \cdot VE \tag{4}$$

Assuming that a voltage dividing ratio of the voltage divider 26 is k3, an output voltage V26 of this voltage divider 26 is given by the following equation.

$$V26 = k3 \cdot V22 = k3 \cdot \frac{R10}{R8} \cdot VE \tag{5}$$

Although an output voltage V2 in proportion to a weight FX (kg) is generated from the load cell 2, this output voltage V2 is given by the following equation when it is assumed that a rated weight of the load cell 2 is FN (kg) and a sensitivity is k (v/v) and a zero-balance is VB (V).

$$V2 = \frac{FX}{FN} \cdot k \cdot VE + VB \tag{6}$$

In the case where FX=0, an output voltage V2 (O) which is equal to the zero-balance voltage VB is generated from the load cell 2.

Also, in the case where FX=FN, the output voltage V2 (N) which is equal to (k·VE+VB) is generated from the load cell 2. Therefore, a voltage span VSP of the load cell 2 is given by the following equation.

$$VSP = V2\,(N) - V2\,(O) = k \cdot VE \tag{7}$$

In this embodiment, since two dummy load cell output voltages having the voltage span VSP are applied to the filter 4 in the sensitivity checking mode, the voltage dividing ratio k3 of the voltage divider 26 is determined so as to allow the output voltage V26 of the voltage divider 26 to be equal to the voltage V2 (N).

The A/D converting operation of the load cell type weight measuring device shown in FIGS. 1 and 2 will then be described with reference to FIGS. 3A to 3C.

In the A/D converter 8, a phase setting pulse signal as shown in FIG. 3A is generated in response to a clock pulse from, e.g., the clock generator 10. A control signal responsive to this phase setting pulse signal is supplied to the switch control circuit 32 and switch control signals shown in FIGS. 3B and 3C are respectively supplied from the switch circuit 32 to the switch S4 and the switches S5 and S6. One cycle of this A/D converting operation is constituted by an offset correction phase P1, an input signal integrating phase P2 and a reference signal integrating phase P3.

In the offset correction phase P1, the switch S4 is set into the OFF state and the switches S5 and S6 are set into the ON state, so that the output voltage V28 of the reference point setting circuit 28 is supplied to the operation amplifier 6-1. In this case, assuming that an offset voltage of the operation amplifier 6-1 is VOF, an output voltage V6 (T1) of the amplifier circuit 6 will be given by the following equation.

$$V6\ (T1) = \left(1 + \frac{R2}{R1}\right)(V28 + VOF) \quad (8)$$

Also, in this case, since the switch S6 is in the ON state, in the case where it is possible to regard an input impedance of the A/D converter 8 as infinity, the capacitor C1 is charged toward the voltage V6 (T1). A charging voltage VC of the capacitor C1 while it is charging is given by the following equation.

$$VC = V6\ (T1) \cdot (1 - e^{-T1/C1 \cdot RX}) \quad (9)$$

where, RX is a sum of the resistance R3 and the resistance of the switch S6.

In the input signal integrating phase P2, since the switch S4 is set into the ON state and the switches S5 and S6 are set into the OFF state, the output voltage V4 of the filter 4 is supplied to the amplifier circuit 6. At this time, the output voltage V6 (T2) of the amplifier circuit 6 will be given by the following equation.

$$V6\ (T2) = \left(1 + \frac{R2}{R1}\right)(V4 + VOF) \quad (10)$$

Due to this, an input voltage V8 represented by the following equation is supplied to the A/D converter 8.

$$V8 = V6\ (T2) - V6\ (T1) = \left(1 + \frac{R2}{R1}\right)(V4 - V28) \quad (11)$$

Assuming that the digital data corresponding to an interval T2 of the input signal integrating phase P2 is NS ($=f_c \times T2$), the digital output NR of the A/D converter 8 is given by the following equation.

$$NR = \frac{V8}{VR} \cdot 2 \cdot NS \quad (12)$$

This equation (12) is implemented by reducing the input voltage V8 at a predetermined rate and counting the time until it reaches the reference level in the reference signal integrating phase P3. The interval of this reference signal integrating phase P3 is set into 2T1.

By substituting equation (2), (3) and (11) for this equation (12), the following equation is derived.

$$NR = \frac{\left(1 + \frac{R2}{R1}\right)\left(V4 - k1 \cdot k2 \cdot \frac{R6}{R4} \cdot VE\right)}{k1 \cdot \frac{R6}{R4} \cdot VE} \cdot 2 \cdot NS \quad (13)$$

Assume now that the switch S1 is set into the ON state and the switches S2 and S3 are set into the OFF state. In this case, the output voltage V2 of the load cell 2 is supplied to the amplifier circuit 6 through the filter 4. When V2=V4, by substituting equation (6) for equation (13), the following equation is derived.

$$NR = \frac{\left(1 - \frac{R2}{R1}\right)\left(\frac{FX}{FN} \cdot k + \frac{VB}{VE} - k1 \cdot k2 \cdot \frac{R6}{R4}\right)}{k1 \cdot \frac{R6}{R4}} \quad (14)$$

$$\cdot 2 \cdot NS$$

Since VB varies in proportion to VE, NR will not be subjected to the fluctuation of VE.

Now, assuming that the digital output when FX=0 is NR (O) and the digital output when FX=FN is NR (N), the span NSP of the digital output is given by the following equation.

$$NSP = NR\ (N) - NR\ (O)$$

$$= \frac{\left(1 + \frac{R2}{R1}\right) \cdot k}{k1 \cdot \frac{R6}{R4}} \cdot 2 \cdot NS$$

In this case, if $$\left(\frac{VB}{VE} - k1 \cdot k2 \cdot \frac{R6}{R4}\right)$$

is set so that NR (N)>0 and NR (O)<0, and by using the A/D converter which can convert the positive and negative input voltages to the digital output data, the resolution power of this A/D converter 8 can be doubled. Namely, as shown in FIG. 4, by setting the digital output of the A/D converter 8 into 0 when FX=FN/2 and by setting the input/output characteristics of the A/D converter 8 so that NR (N)= −NR (O), the resolution power of the A/D converter 8 can be doubled.

Next, the sensitivity checking examination of the load cell type weight measuring device shown in FIGS. 1 and 2 will be described.

The microcomputer 12 gives a control signal to the switch control 30, thereby allowing this switch control 30 to supply switch control signals shown in FIGS. 5A to 5C to the switches S1 to S3. In addition, intervals TF1 to TF13 in FIGS. 5A to 5C are each equal to the interval of one operation cycle shown in FIG. 3A, and the offset correction phase P1, input signal integrating phase P2 and reference signal integrating phase P3 are included in each interval.

In FIGS. 5A to 5C, when the weight measuring operation is executed for the intervals T1 and T2 and the sensitivity checking key is operated, the sensitivity checking examination is executed in the intervals TF3 to TF8. Namely, when the switch control signal shown in FIG. 5A is at a high level, the weight measuring mode is set and when the switch control signal of FIG. 5A is at a low level and when the switch S1 is closed, the sensitivity checking mode is set. A sensitivity data NRSP can be obtained from the difference between the digital output NR (S2) from the A/D converter 8 which is derived when the switch control signal of FIG. 5B is at a high level to keep the switch S2 ON, and the digital output NR (S3) which is derived when the switch control signal of FIG. 5C is at a high level to keep the switch S3 ON.

For instance, when the sensitivity checking key is operated in the interval TF2, the switch S2 is closed in the interval TF3, so that the input voltage of 0 V is supplied through the filter 4 and switch S4 to the amplifier circuit 6 in the input signal integrating phase P2 and reference signal integrating phase P3. In this case, the digital output NR (S2) of the A/D converter 8 will be given by the following equation if V4=0 in equation (13).

$$NR\ (S2) = \frac{\left(1 + \frac{R2}{R1}\right)\left(-k1 \cdot k2 \cdot \frac{R6}{R4} \cdot VE\right)}{k1 \cdot \frac{R6}{R4} \cdot VE} \cdot 2 \cdot NS \qquad (16)$$

$$= \left(1 + \frac{R2}{R1}\right)(-k2)$$

This digital output NR (S2) is stored in a memory (not shown) in the microcomputer 12. The similar operation is executed, for example, even in the subsequent intervals T4 and T5 and the digital data derived in the respective intervals T3 to T5 are checked to see if they are stable or not. In the interval T6 immediately after the digital data were confirmed to be stable, when the switch S2 is opened and the switch S3 is closed, the output voltage of the voltage divider 26 is supplied to the amplifier circuit 6 through the filter 4 and switch S4. In this case, since the output voltage V26 shown in equation (5) is generated from the voltage divider 26, the digital output data NR (S3) from the A/D converter 8 will be given by the following equation.

$$NR\ (S3) = \frac{\left(1 + \frac{R2}{R1}\right)\left(V26 - k1 \cdot k2 \cdot \frac{R6}{R4} \cdot VE\right)}{k1 \cdot \frac{R6}{R4} \cdot VE} \cdot 2 \cdot NS \qquad (17)$$

$$= \frac{\left(1 + \frac{R2}{R1}\right)\left(k3 \cdot \frac{R10}{R8} \cdot VE - k1 \cdot k2 \cdot \frac{R6}{R4} \cdot VE\right)}{k1 \cdot \frac{R6}{R4} \cdot VE} \cdot 2 \cdot NS$$

$$= \frac{\left(1 + \frac{R2}{R1}\right)\left(k3 \cdot \frac{R10}{R8} - k1 \cdot k2 \cdot \frac{R5}{R4} \cdot VE\right)}{k1 \cdot \frac{R6}{R4}} \cdot 2 \cdot NS$$

This digital output data NR (S3) is also stored in the memory in the microcomputer 12. The digital data derived in the intervals TF6, TF7 and TF8 in this way are checked to see if they are stable or not. After they were confirmed to be stable, the sensitivity calculation is immediately executed.

As is obvious from equations (16) and (17), since both digital outputs NR (S2) and NR (S3) are independent from the voltage VE, the digital output data NR (S2) and NR (S3) do not vary in dependence upon the variation in this power source voltage VE.

The microcomputer 12 calculates the difference between the digital output data NR (S2) and NR (S3) stored in the memory to obtain the sensitivity data NRSP represented by the following equation.

$$NRSP = NR\ (S3) - NR\ (S2) \qquad (18)$$

$$= \frac{1 + \frac{R2}{R1}}{k1 \cdot \frac{R6}{R4}} \cdot k3 \cdot \frac{R10}{R8} \cdot 2 \cdot NS$$

This sensitivity data NRSP is compared with a sensitivity reference value NRRF which has been preset by the microcomputer 12. When the difference between them is within a permissible range of $\pm \alpha$, the digital output to be obtained in the weight measuring mode after, e.g., interval TF9, is displayed as the effective weight data on the display 16. On the other hand, when the difference between them exceeds the permissible range of $\pm \alpha$, the digital output data derived during the measurement interval is made invalid and the invalid data is displayed on the display 16.

FIG. 6 shows the flowchart to explain the operation of the load cell type weight measuring device shown in FIGS. 1 and 2.

When it is detected that the sensitivity checking key was operated, the microcomputer 12 first turns on the switch S2 to execute the sensitivity checking examination and turns off the switches S1 and S3. In this state, the digital output data NR (S2) is generated from the A/D converter 8 as indicated in equation (16). In this embodiment, the digital output data are respectively derived in three operation cycles (e.g., intervals TF3, TF4 and TF5). In the case where the maximum error among these three digital output data is less than a predetermined value, one of the three digital output data is stored in the memory as the effective data NR (S2). Then, the switches S1 and S2 are turned off and the switch S3 is turned on. In this state, the digital output data NR (S3) is generated from the A/D converter 8 as indicated by equation (17). Also, in this case, the digital output data are respectively derived in three operation cycles (e.g., intervals TF6 to TF8). In the case where the maximum error among these three digital output data is less than a predetermined value, one of the three digital output data is stored in the memory as the effective data NR (S3). Subsequently, the sensitivity NRSP is calculated by subtracting the digital output data NR (S2) from the digital output data NR (S3). The difference between this sensitivity NRSP and the reference sensitivity NRRF is obtained and this difference is checked to see if it is within the permissible range $\pm \alpha$ or not. If it is detected that the difference is within the permissible range, the switches S2 and S3 are turned off and the switch S1 is turned on, thereby executing the weight measuring operation. The weight measurement data obtained from the A/D converter 8 in this way is displayed on the display 16. In contrast, in the case where it is detected that the difference between the NRSP and the NRRF is out of the permissible range of $\pm \alpha$, the microcomputer 12 executes the error indication and at the same time it interrupts the weight measuring operation.

Although the present invention has been described in the above with respect to one embodiment, the invention is not limited to only this embodiment. For instance, although the A/D converter 8 of the dual slope type has been used, any other type of A/D converter which is ordinarily well known may be also used. In addition, although the sensitivity checking key has been used in the foregoing embodiment, it is possible to omit this sensitivity checking key and to automatically set the sensitivity checking mode and weight measuring mode alternately. In such a case, for example, under the control of the microcomputer 12, it is possible to close the switch S1 for six operation cycles and set the weight measuring mode, then to sequentially close the switches S2 and S3 in this sequence for three operation cycles, respectively, and set the sensitivity checking mode, thereby alternately setting the weight measuring mode and sensitivity checking mode.

What is claimed is:

1. A load cell type weight measuring device, comprising:
   power source means;
   a load cell which is connected to said power source means and produces an output voltage corresponding to the weight applied thereto;
   rated voltage generating means for generating an output voltage which has been set at a predetermined level substantially equal to that of the output voltage generated from said load cell which is applied with a rated weight;
   a reference potential terminal;
   amplifier means;
   reference voltage generating means;
   switching means for selectively connecting one of said load cell, said rated voltage generating means and said reference potential terminal to said amplifier means;
   analog/digital converting means for converting an output voltage of said amplifier means to digital data in accordance with a reference voltage from said reference voltage generating means; and
   data processing means for controlling said switching means and inhibiting the output data of said analog/digital converting means from being supplied as effective weight measurement data when it is detected that the difference between two items of digital data from said analog/digital converting means, one obtained when said rated voltage generating means is connected to said amplifier means and the other obtained when said reference potential terminal is connected to said amplifier means, exceeds a predetermined range.

2. A load cell type weight measuring device according to claim 1, further comprising a keyboard which includes at least a sensitivity checking key, and when it is detected that said sensitivity checking key was operated, said data processing means gives control signals to said switching means and connects said reference potential terminal and said rated voltage generating means to said amplifier means and checks to see if the difference between the digital data generated at this time from said analog/digital converting means lies within a predetermined range or not.

3. A load cell type weight measuring device according to claim 1, wherein said A/D converting means is a dual slope type A/D converter.

4. A load cell type weight measuring device according to claim 1, wherein said reference voltage generating means includes a second amplifier circuit coupled to said power source means and a voltage dividing circuit for dividing an output voltage of said second amplifier circuit.

5. A load cell type weight measuring device according to claim 1, further comprising a keyboard which includes at least a sensitivity checking key, and when it is detected that said sensitivity checking key was operated, said data processing means gives control signals to said switching means and connects said reference potential terminal and said rated voltage generating means to said amplifier means and checks to see if the difference between the digital data generated at this time from said analog/digital converting means lies within a predetermined range or not.

6. A load cell type weight measuring device according to claim 1, wherein said switching means includes first to third switches which are respectively connected between said amplifier means and said reference potential terminal, said load cell, and said rated voltage generating means; and said data processing means selectively and time-sequentially turns on said first to third switches.

7. A load cell type weight measuring device according to claim 1, further comprising a reference point setting circuit which divides the output voltage of said reference voltage generating means and generates an output voltage to set an operation point of said amplifier means.

8. A load cell type weight measuring device according to claim 7, wherein said reference point setting circuit includes: an amplifier connected to an output terminal of said reference voltage generating means; and a voltage divider which divides an output voltage of said amplifier and supplies the divided output voltage to said amplifier means.

9. A load cell type weight measuring device according to claim 1, further comprising a reference point setting circuit which divides the output voltage of said reference voltage generating means and generates an output voltage to set an operation point of said amplifier means.

10. A load cell type weight measuring device according to claim 9, wherein said reference point setting circuit includes: an amplifier connected to an output terminal of said reference voltage generating means; and a voltage divider which divides an output voltage of said amplifier and supplies the divided output voltage to said amplifier means.

11. A load cell type weight measuring device according to claim 1, wherein said rated voltage generating means is constituted by a first amplifier circuit coupled to said power source means and a voltage dividing circuit for dividing an output voltage of said first amplifier circuit.

12. A load cell type weight measuring device according to claim 11, further comprising a keyboard which includes at least a sensitivity checking key, and when it is detected that said sensitivity checking key was operated, said data processing means gives control signals to said switching means and connects said reference potential terminal and said rated voltage generating means to said amplifier means and checks to see if the difference between the digital data generated at this time from said analog/digital converting means lies within a predetermined range or not.

13. A load cell type weight measuring device according to claim 11, wherein said A/D converting means is a dual slope type A/D converter.

14. A load cell type weight measuring device according to claim 11, further comprising a reference point setting circuit which divides the output voltage of said reference voltage generating means and generates an output voltage to set an operation point of said amplifier means.

15. A load cell type weight measuring device according to claim 14, wherein said reference point setting circuit includes: an amplifier connected to an output terminal of said reference voltage generating means; and a voltage divider which divides an output voltage of said amplifier and supplies the divided output voltage to said amplifier means.

16. A load cell type weight measuring device according to claim 11, wherein said reference voltage generating means includes a second amplifier circuit coupled to said power source means and a voltage dividing circuit for dividing an output voltage of said second amplifier circuit.

17. A load cell type weight measuring device according to claim 16, further comprising a reference point setting circuit which divides the output voltage of said reference voltage generating means and generates an output voltage to set an operation point of said amplifier means.

18. A load cell type weight measuring device according to claim 17, wherein said reference point setting circuit includes: an amplifier connected to an output terminal of said reference voltage generating means; and a voltage divider which divides an output voltage of said amplifier and the supplies the divided output voltage to said amplifier means.

19. A load cell type weight measuring device according to claim 17, further comprising a keyboard which includes at least a sensitivity checking key, and when it is detected that said sensitivity checking key was operated, said data processing means gives control signals to said switching means and connects said reference potential terminal and said rated voltage generating means to said amplifier means and checks to see if the difference between the digital data generated at this time from said analog/digital converting means lies within a predetermined range or not.

20. A load cell type weight measuring device according to claim 17, wherein said A/D converting means is a dual slope type A/D converter.

* * * * *

UNITED STATES PATENT AND TRADEMARK OFFICE
CERTIFICATE OF CORRECTION

PATENT NO. : 4,580,644
DATED : April 8, 1986
INVENTOR(S) : Y. NISHIYAMA

It is certified that error appears in the above-identified patent and that said Letters Patent is hereby corrected as shown below:

COLUMN 4, line 67, before "circuit 32", insert --control--;

COLUMN 12, line 8 (claim 18), before "supplies", delete "the".

Signed and Sealed this

Ninth Day of December, 1986

Attest:

DONALD J. QUIGG

*Attesting Officer*  *Commissioner of Patents and Trademarks*